United States Patent [19]

Crocker

[11] Patent Number: 5,562,061
[45] Date of Patent: Oct. 8, 1996

[54] ICE AND WATER VEHICLE

[76] Inventor: Ken N. Crocker, 34 Galpin St., Naugatuck, Conn. 06770

[21] Appl. No.: 575,758

[22] Filed: Dec. 20, 1995

[51] Int. Cl.⁶ .................................................. B62B 15/00
[52] U.S. Cl. .............................. 114/43; 114/272; 440/37
[58] Field of Search ............................. 114/43, 61, 123, 114/271, 272, 273, 274, 281, 283, 292, 144 R; 440/37; 180/182, 183

[56] References Cited

U.S. PATENT DOCUMENTS

| 1,816,118 | 7/1931 | Knight | 114/43 |
|---|---|---|---|
| 2,340,558 | 2/1944 | Porter | 180/183 |
| 4,237,810 | 12/1980 | Westfall | 114/272 |
| 5,112,257 | 5/1992 | Grise | 440/37 |
| 5,314,035 | 5/1994 | Schoell | 114/272 |
| 5,359,958 | 11/1994 | Guild | 114/272 |

Primary Examiner—Stephen Avila
Attorney, Agent, or Firm—Lawrence Hager

[57] ABSTRACT

A vehicle designed as a dual function ice and water craft having an improved aerodynamic floatable hull supportable on a tripod of ice skate-like blades which also function as stabilizers when the craft is used in water. Aerodynamically designed side pylons serve both as flotation devices and as energy absorbing crush pads for improved safety in case of a crash. A pittman type steering mechanism is provided for improved control of the front steering/rudder blade. A front and rear stabilizer is used to provide a unique control for an ice craft and bow control for a water craft.

15 Claims, 3 Drawing Sheets

ICE AND WATER VEHICLE

FIELD OF INVENTION

The present invention relates to so-called ice boats and a high speed water craft and, more particularly, to a motorized air propelled dual function high speed ice and water vehicle having improved stabilization and safety features.

BACKGROUND OF THE INVENTION

Ice boats such as those that use a sail are well known in which a carriage is mounted on ice blades or runners. The prior art also reveals several types of ice boats which are propeller driven. For example, U.S. Pat. No. 3,814,197 issued Jun. 4, 1974 to Miloje Milankow et al which describes a motor driven ice vehicle capable of being dismantled for transportation. Also disclosed in the prior art is a combination snow and water vehicle which use a plurality of snow type skis mounted on lifting support members as described in U.S. Pat. No. 3,841,649 issued Oct. 15, 1974 to Wayne W. McMullen.

PRIOR ART STATEMENT

The prior art includes various designs for boats, ice boats, and the like which include the following U.S. Pat. Nos.: 167,627 issued to Story; 429,265 issued to Fendel; 529,494 issued to Holt; 1,363,071 issued to Williams; 1,909,233 issued to Sovik; 2,340,558 issued to Porter; 2,528,397 issued to Stof; 3,057,633 issued to Brousseau; 3,480,289 issued to Larkin; 3,109,665 issued to Remmen; and 3,583,507 issued to Trautwein.

The above cited patent references are noted as of interest and other pertinent references may exist. None of the above cited references are deemed to affect the patentability of the present claimed invention.

SUMMARY OF THE INVENTION

A dual function ice and water sport vehicle comprising:

a structurally improved fuselage or chassis having an aerodynamic skid and flotation undercarriage for improved wave running in water while providing a low center of gravity for improved stabilization of its ice boating functions as well as tilt resistance when being operated as a water vehicle;

a safety rollbar and contoured windshield for improved aerodynamics and safety;

a pair of spaced apart discrete pontoon like dual function flotation and crash energy absorbing devices mountable atop of said skid undercarriage on either side of the fuselage;

a pair of horizontal stabilizers used to improve the traction of the front and rear skates while reducing the possibility of uplifting of the vehicle from air forces on the bottom surface of the skid undercarriage;

a pittman arm steering mechanism attached to the front skate/rudder blade for improved steering control and breaking.

OBJECTS OF THE INVENTION

It is an object of the present invention to provide a new and improved ice vehicle.

It is another object of the present invention to provide a new and improved water vehicle.

It is another object of the present invention to provide a dual function ice and water vehicle.

It is another object of the present invention to provide an improved aerodynamic designed ice vehicle.

It is. another object of the present invention to provide an improved steering mechanism for an ice and water vehicle.

It is another object of the present invention to provide an improved safety fuselage, rollbar and windshield for a dual function ice and water vehicle.

It is yet another object of the present invention to provide a pair of dual function floatation and crash energy absorbing side mounted pontoons for an ice and water vehicle.

It is another object of the present invention to provide a pittman steering wheel device for controlling the disposition of an ice skate blade used to steer an ice vehicle.

It is another object of the present invention to provide a dual function ice and water vehicle which is driven by means of a propeller mounted on a support beam projecting from the rear of the carriage or fuselage.

It is another object of the present invention to provide an ice vehicle which utilizes one or more air foil type stabilizers.

It is another object of the present invention to provide an aerodynamic skid undercarriage or wing member for providing improved center of gravity stability and wave running capability and anti-tilting stabilization of an ice and/or water vehicle.

BRIEF DESCRIPTION OF THE DRAWINGS

The objects, features and advantages of the invention may be understood with reference to the following detailed description of an illustrated embodiment of the invention, taken together with the accompanying drawings in which.

DETAILED DESCRIPTION OF THE PREFERRED EMBODIMENT

Figure 1:
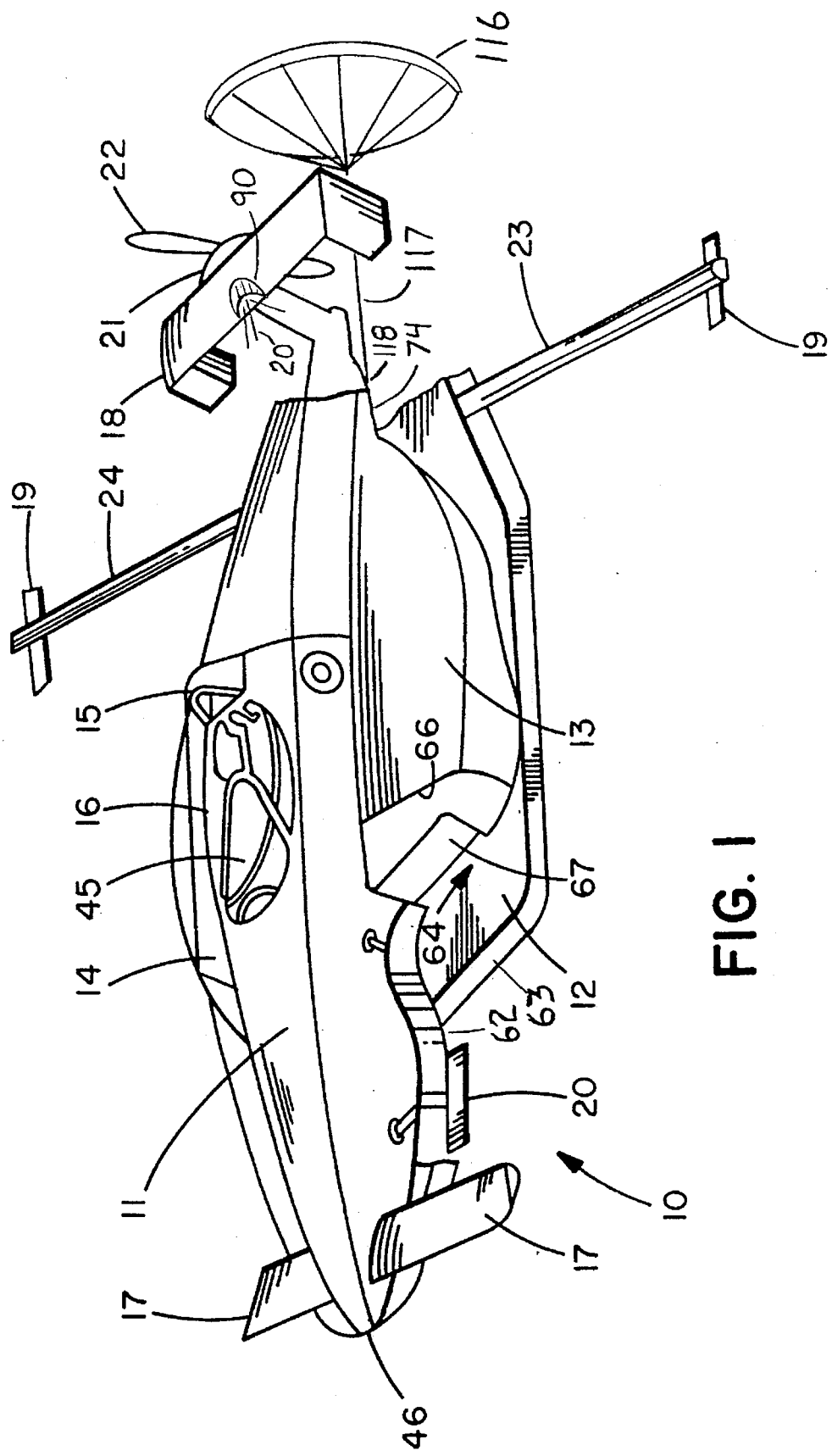
FIG. 1 is a perspective view of the dual function ice and water vehicle.

With reference now to FIG. 1, shown is a preferred embodiment of the vehicle of the invention, indicated generally at 10. The vehicle 10 is shown having a fuselage or chassis 11, a lower skid platform 12, a pair of spaced floatation pontoons 13, 14 a rollbar member 15, a windshield 16, a front stabilizer 17, a rear stabilizer 18, pair of spaced apart rear downwardly extending lifting members or ice skate blades 19, a front ice skate steering blade 20, a rear mounted motor 21 driven propeller 22 and a pair of extendable and retractable stabilizer skate blade support arms 23, 24.

Figure 2:
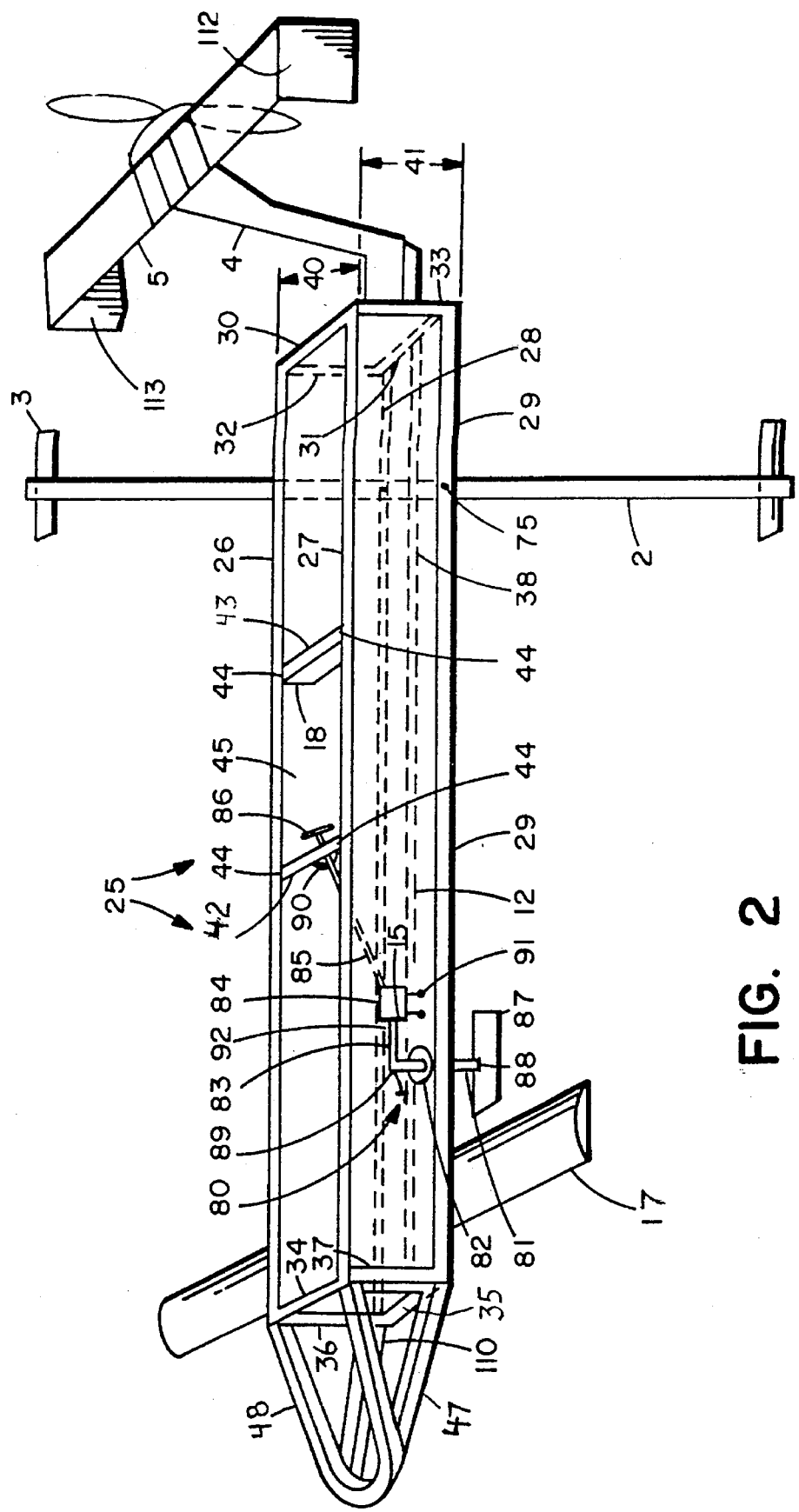
FIG. 2 is a plain view of the chassis, steering mechanism, rollbar and motor mounting in accordance with the invention.

As shown in FIG. 2, the hull or chassis shown at 25 generally comprises a rectangular configuration formed of a plurality of, for example, tubular steel or aluminum or box shaped beams 26–37. Four elongated side beams or rails 26–29 are spaced apart to define the hull's length. Interconnecting support rear beams 30–33 and front support beams 34–37, as shown in FIG. 2, define the hulls width 40 and height 41. A pair of support cross beams 42, 43 are mounted, for example welded 44, between the upper left and right elongated beams 27, 26, to both define the driver's compartment 45 of the vehicle 10 and to provide structural support and rigidity to the upper beams 26, 27.

A contoured rollbar and windshield rear support member 15 is affixed, for example welded or bolted (not shown), between upper beams 26, 27. The function of the rollbar member 15 is to provide a safety member to protect the head of the operator in case the vehicle 10 rolls over in a crash.

The front end member 46 is supported by a pair of contoured bar members 47, 110, and a front end beam 48 and covered, for example, with sheet aluminum or fiber glass, with an outer skin 49. Front end member 46 is contoured as an aerodynamic air foil to provide a downward force on the front of the vehicle 10 as the air stream, illustrated by a plurality of arrows 50 shown in FIG. 5, passes over the front end member 46. The front end member's support bar members 47, 110, 48 are affixed, for example, welded, to the front beams 34, 35 of the hull 25. End tip 76 is affixed, for example, welded, 77 to contoured bar members 47, 48.

Figure 3:
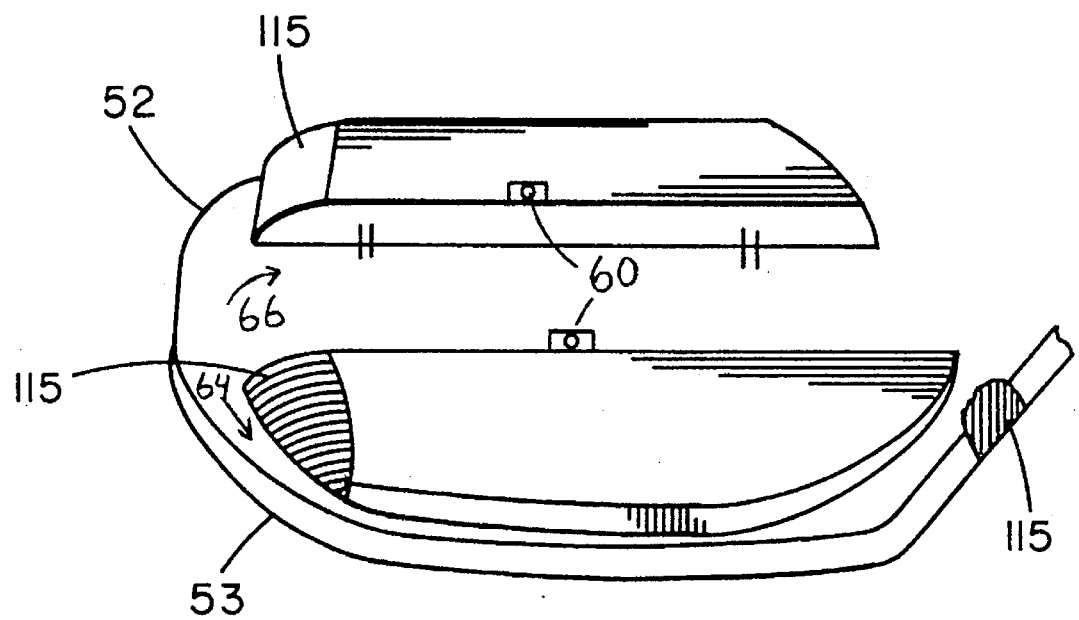
FIG. 3 is a perspective partially exploded view of the horizontal skid platform or undercarriage with the side mountable pontoons.
Figure 4:
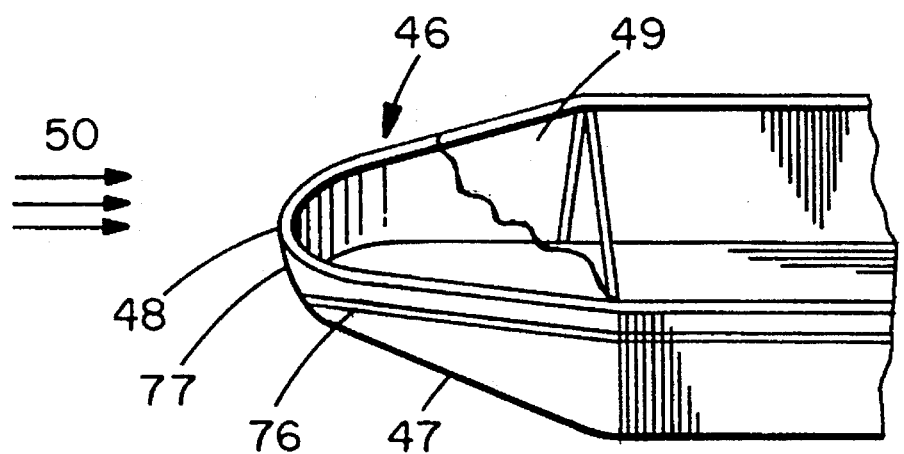
FIG. 4 is a perspective view of the nose section of the chassis.

The lower skid platform 12 as illustrated in FIGS. 1 and 3, basically comprises an aerodynamically designed platform having a contoured front end 52 which curves upwardly 53 toward the hull 25. The specific size, thickness and contours may vary depending on design requirements and predetermined aesthetic considerations. Lower skid member 12 generally comprises a flotation material such as, for example, styrofoam 115 having predetermined flexing, strength and density characteristics of such as conventionally used in surfboard type devices, and is coated with, for example, fiberglass or plastic. In this manner, the lower skid member 12 provides a flotation member, which when affixed in conventional manner, for example, bolts 60, onto the bottom surface 62 of hull 25. The expanse and design of the lower skid member 12 with outwardly extending wing like portions 63 facilitates the stability of the vehicle by providing a lower center of gravity to the vehicle 10. Lower skid platform member 12 may be readily dismantled from the hull to enable easy transportation to and from the lake or ice.

Each side pontoon 13, 14 may be formed of any suitable material such as, for example, aluminum, plastic and the like. Generally speaking, each pontoon 13, 14 may be filled with a lightweight filler material such as styrofoam 67 or form a sealed air pocket. The dimensions and configuration of each pontoon 13, 14 is designed to be aerodynamically mounted atop a wing member 63 on a respective side of hull 25. Each pontoon 13, 14 has a wind deflecting configuration or wall portion 115 for deflecting the airstream as illustrated by arrow 64, and a beveled air portion 115 for deflecting a portion of the air stream upwardly as illustrated by arrow 66. In this manner, the vector forces being applied to vehicle 10 tend to stabilize its forward motion and apply a downward pressure or force which increases dynamically as the speed of the vehicle 10 increases. Another feature of each pontoon 13, 14 is its energy absorbing ability, i.e., crunching or collapsibility, when impacted during a crash. Each pontoon 13, 14 may be affixed to the top of a respective wing portion of the lower skid platform 12 in conventional manner such as by bolts, screws and the like (not shown). Affixing bolts may also be provided to affix each pontoon 13, 14 to a respective side of hull 25. Since the specific bolting or other forms of attaching the pontoons 13, 14 to the lower skid platform 12 and/or hull 25, are conventional and, therefore, exhaustive description thereof will not be provided to avoid prolixity.

A shatter proof and aerodynamically shaped windshield 16 is for example, hinge mounted to the top crossbar 43 of hull 25 in conventional manner. The other side edges of windshield 16 are contoured to mate with the hull sections and rollbar member 15.

A pair of spaced apart downwardly projecting ice skate like blades 19 are mounted to an end portion of an outwardly projecting arm member 23, 24. Although the preferred embodiment utilizes a unified beam which extends outwardly from each side of a rear section 74 of hull 25, it is recognized that other designs may be used, for example, a pair of discrete arm members (not shown) which may be each slidably mounted in a respective bracket to enable slide retraction and extension of each skate blade carrying arm member. In the preferred embodiment, however, a single elongated beam 23, 24 is affixed in conventional manner, for example, bolts 75 to the hull chassis beams 28, 29 (see FIG. 2).

The front skate/rudder support and steering mechanism 80 generally comprises a vertically oriented steering rod 81, a mounting bracket 82, a pittman arm 83, a steering box 84, a steering column 85 and a steering wheel 86. The front support and steering blade 87 is affixed such as by weld 88 to the downwardly projecting end of steering rod 81. Mounting bracket 82 may be of conventional design and may include a plurality of ball bearings (not shown). The pittman arm 83 is affixed, for example welded or bolted in conventional manner, at one end to an upper section 89 of steering rod 81. The other end of pittman arm 83 engages a steering gear mechanism of conventional design located within steering box 84. A conventional type steering wheel 86 and steering column 85 are mounted to the chassis 25 in conventional manner such as bracket 90. Steering box 84 may be bolted 91 onto the chassis 25 such as to beam 38.

In operation, rotation of steering wheel 86 clockwise and counterclockwise causes the end 92 of the pittman arm 83 to move in a horizontal plane toward one side of the vehicle 10 and then toward the other side, respectively. This disposition of pittman arm 83 results in a coincidental rotation of steering rod 81 and, in turn, blade 87. The front ice skate blade 87 serves both to steer the vehicle 10 when used on ice and as a front rudder steering means when the vehicle is utilized as a speed boat on, for example, lake water.

The front and rear wing shaped stabilizers 17 and 18 are provided to stabilize the vehicle 10 during high speeds of travel. Thus, in accordance with a feature of the invention, the stabilizers 17, 18 are designed to interact with the air stream (not shown) to provide a downwardly directed force on the vehicle 10 for improved ice blade 19 contact with the ice surface. It should also be noted that the stabilizers 17, 18 function to compensate for the upward lift experience by the vehicle 10 as an effect of the curvature of the front portion 52 engagement with the surface water of a lake (not shown) when the vehicle is utilized on water.

The downwardly projecting wing members 112, 113, provide stabilization to reduce or eliminate rear fish-tailing or rocking motion from side to side.

A night light 90 is mounted by conventional means (not shown) to the rear stabilizer 18 for providing illumination 20 to facilitate night time operation/cursing of the vehicle 10. The light 90 may be turned on/off in conventional manner by means of a switcher (not shown) mounted in the passenger compartment 45.

A parachute 116 may be affixed to a cable 117, which in turn is affixed 118 to vehicle 10. Parachute 116 and cable 117 may be folded and stored in a compartment at the rear of vehicle 10. Deployment of parachute 116 as illustrated in FIG. 1 may be effected by the operator by conventional switch means located within the operator compartment 45. Parachute 116 may be of conventional design and is operated or deployed in an emergency to facilitate a rapid stopping of the vehicle 10.

The rear motor 21 driven propeller 22 may be of conventional design and is mounted on the chassis 25 by conventional means such as support transom 4 being bolted (not shown) to chassis beam 38.

This craft or vehicle may utilize dimensions of a so-called tripod configuration to enhance stabilization. For example, the overall length from nose 46 to engine 22 may be approximately 12 feet in length, with an 8 feet span or separation between ice blades 19, and a support transom 4 having a height of approximately 7 feet. In this manner improved function and control is achieved.

The preferred embodiment should be taken as illustrative of the invention and other embodiments may be designed without departing from the scope of the invention.

What is claimed is:

1. A vehicle for travel over ice and water in combination, comprising:

a hull having a chassis including a plurality of beam means for providing structural strength to a defined passenger compartment and having a front end and a rear end;

a nose cone means attached to the front end of said hull and having a downwardly sloping top surface portion for aerodynamic stability;

a tail section attached to the rear end including a motor driven propeller and a rear stabilizer means for aerodynamic stability;

a front end stabilizer means affixed to the vehicle for aerodynamic stability;

a buoyant platform means attached to said hull and having side wind portions extending outwardly from each side of said hull for stability and buoyance of the vehicle;

a pair of buoyant pontoon means each affixed atop a respective one of said side wind portions for stability and buoyance of the vehicle;

a pair of spaced apart ice skate blade means each assembled to a respective one side of said rear end of said hull for providing lifting support with the vehicle being used over ice;

a steering blade means assembled to a central portion of said front end of said hull for providing lifting support with the vehicle being used over ice; and a steering assembly affixed to said hull and operatively coupled to said steering blade means and being manually operative for steering the vehicle over ice and water.

2. A vehicle as in claim 1, wherein:

the passenger compartment includes a steering wheel and a passenger seat.

3. A vehicle as in claim 1, wherein:

the hull includes a rollbar means (15) for providing a safety member to protect an operator of the vehicle during a roll over of the vehicle.

4. A vehicle as in claim 1, wherein:

the vehicle includes a windshield means (16) being mountable over the passenger compartment for provided aerodynamic stability to the vehicle and safety.

5. A vehicle as in claim 1, wherein:

the hull beam means includes a plurality of metal elongated support beams (26–29) defining the length of said hull (25), and a plurality of cross beams (30, 31, 34, 35) defining the width of said hull, and a lower central elongated support beam extending across the longitudinal length of said hull and projecting outwardly from said front end to form a support arm 110 for said nose cone means 46 and projecting outwardly from said rear end to form a rear support arm for said tail section.

6. A vehicle as in claim 1, wherein:

the rear stabilizer means comprises an elongated tail wing-like rectangular shaped board member (18) having a downwardly inclined upper surface (112) for interacting with an air stream to generate a downwardly directed force on said rear end with forward motion of the vehicle and having a plurality of tangentially projecting members (113) for reducing side-to-side instability with substantial elimination of so-called fish tail instability.

7. A vehicle as in claim 1, wherein:

the platform means (12) comprises a styrofoam inner core member (58) coated with a fiberglass layer (59) and having a forward curved section (53) for aerodynamic and hydrodynamic facilitation of the vehicle use over ice and water and to provide buoyancy.

8. A vehicle as in claim 1, wherein:

the pontoon means each comprises a streamlined aluminum air filed container having forward inclined portions (115) to facilitate aerodynamic stability.

9. A vehicle as in claim 1, wherein:

the side pontoon means (13, 14) comprises two spaced apart discrete pontoon members each being streamlined and having a styrofoam core 67 with a coated fiberglass outer coating for providing buoyancy and side crash protection to the passenger compartment of said hull.

10. A vehicle as in claim 1, wherein:

the passenger compartment is located and configured so that the weight of the crew or passengers being located therein provide an effective offset to the weight of a rear mounted engine for improved stabilization of the vehicle.

11. A vehicle as in claim 1, including:

a lighting system affixed on the horizontal stabilizer means for night operation of the vehicle.

12. A vehicle as in claim 1, including:

a parachute means for relatively rapid emergency stopping of the vehicle.

13. A vehicle as in claim 1, wherein:

the ice skate blade means being configured to enable and provide for improved cruising operation of the vehicle on both ice and snow and to substantially prevent stalling on relatively soft and crusted ice.

14. A vehicle as in claim 1, wherein:

the dimension of a pair of skate blade support arms (23,24) and the hull (25) and a rear transom (4) being configured in a tripod configuration for improved cruising operation of the vehicle on both ice and snow.

15. A vehicle for travel over ice and water in combination, comprising:

a hull having a chassis including a plurality of beam means for providing structural strength to a defined passenger compartment and having a front end and a rear end, said hull includes a rollbar means (15) for providing a safety member to protect an operator of the vehicle during a roll over of the vehicle, and includes a windshield means (16) being mountable over a passenger compartment for provided aerodynamic stability to the vehicle and safety, and a hull beam means includes a plurality of metal elongated support beams (26–29) defining the length of said hull (25), and a plurality of cross beams (30, 31, 34, 35) defining the width of said hull, and a lower central elongated support beam extending across the longitudinal length of said hull and projecting outwardly from said front end to form a support arm 110;

a tail section attached to the rear end including a motor driven propeller and a rear stabilizer means for aerodynamic stability, the rear stabilizer means comprises an elongated tail wing-like rectangular shaped board member (18) having a downwardly inclined upper surface (112) for interacting with an air stream to generate a downwardly directed force on said rear end with forward motion of the vehicle and having a plurality of tangentially projecting members (113) for reducing side-to-side instability with substantial elimination of so-called fish tail instability;

a front end stabilizer means affixed to the vehicle for aerodynamic stability;

a buoyant platform means attached to said hull and having side wind portions extending outwardly from each side of said hull for stability and buoyance of the vehicle, the platform means (12) comprises a styrofoam inner core member (58) coated with a fiberglass layer (59) and having a forward curved section (53) for aerodynamic and hydrodynamic facilitation of the vehicle use over ice and water and to provide buoyancy;

a pair of buoyant pontoon means each affixed atop a respective one of said side wind portions for stability and buoyance of the vehicle, the pontoon means each comprises a streamlined aluminum air filed container having forward inclined portions (115) to facilitate aerodynamic stability;

a pair of spaced apart ice skate blade means each assembled to a respective one side of said rear end of said hull for providing lifting support with the vehicle being used over ice, the ice skate blade means being configured to enable and provide for improved cruising operation of the vehicle on both ice and snow and to substantially prevent stalling on relatively soft and crusted ice, and a pair of skate blade support arms (23,24);

a nose cone means attached to the front end of said hull and having a downwardly sloping top surface portion for aerodynamic stability;

a steering blade means assembled to a central portion of said front end of said hull for providing lifting support with the vehicle being used over ice; and a steering assembly affixed to said hull and operatively coupled to said steering blade means and being manually operative for steering the vehicle over ice and water;

a lighting system affixed on the horizontal stabilizer means for night operation of the vehicle;

a parachute means for relatively rapid emergency stopping of the vehicle.

* * * * *